(No Model.) 2 Sheets—Sheet 1.

L. H. DAVIS.
LAWN MOWER.

No. 596,985. Patented Jan. 11, 1898.

WITNESSES
H. H. Lamb
L. G. Friswell

INVENTOR
Luman H. Davis
By A. M. Wooster
Atty.

(No Model.) 2 Sheets—Sheet 2.

L. H. DAVIS.
LAWN MOWER.

No. 596,985. Patented Jan. 11, 1898.

WITNESSES
H. H. Lamb.
L. G. Friswell.

INVENTOR
Luman H. Davis
By A. M. Wooster
Atty.

UNITED STATES PATENT OFFICE.

LUMAN H. DAVIS, OF RIDGEFIELD, CONNECTICUT.

LAWN-MOWER.

SPECIFICATION forming part of Letters Patent No. 596,985, dated January 11, 1898.

Application filed August 28, 1896. Serial No. 604,149. (No model.)

*To all whom it may concern:*

Be it known that I, LUMAN H. DAVIS, a citizen of the United States, residing at Ridgefield, in the county of Fairfield and State of Connecticut, have invented certain new and useful Improvements in Lawn-Mowers; and I do hereby declare the following to be a full, clear, and exact description of the invention, such as will enable others skilled in the art to which it appertains to make and use the same.

My invention has for its object to simplify and cheapen the construction of lawn-mowers, clippers, &c., and at the same time to greatly improve their operation in use.

With these ends in view I have devised the novel construction of which the following description, in connection with the accompanying drawings, is a specification, numbers and letters being used to designate the several parts.

Figure 1:
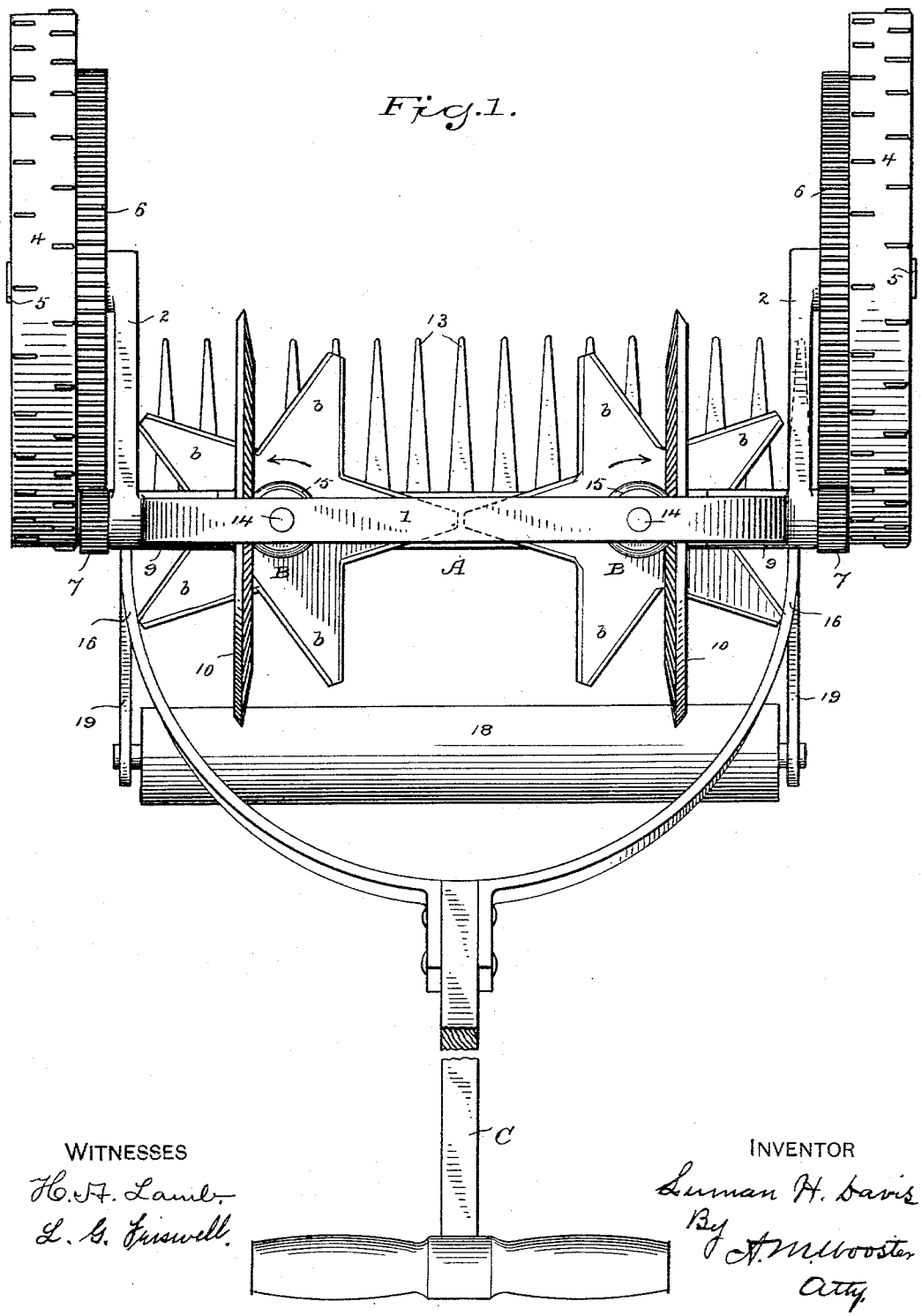
Figure 2:
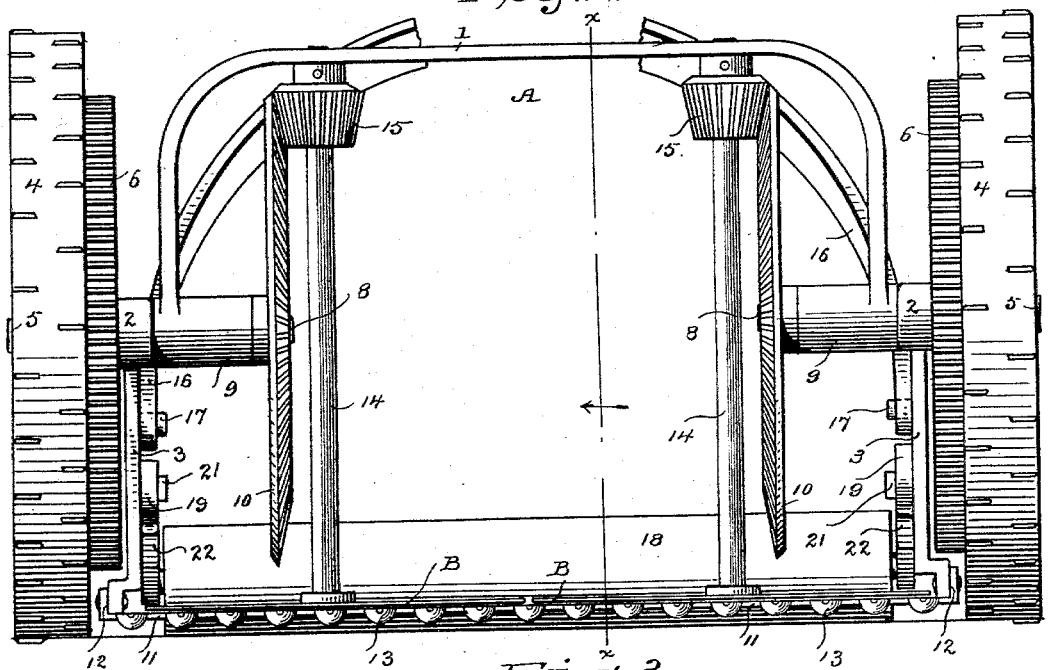
Figure 3:
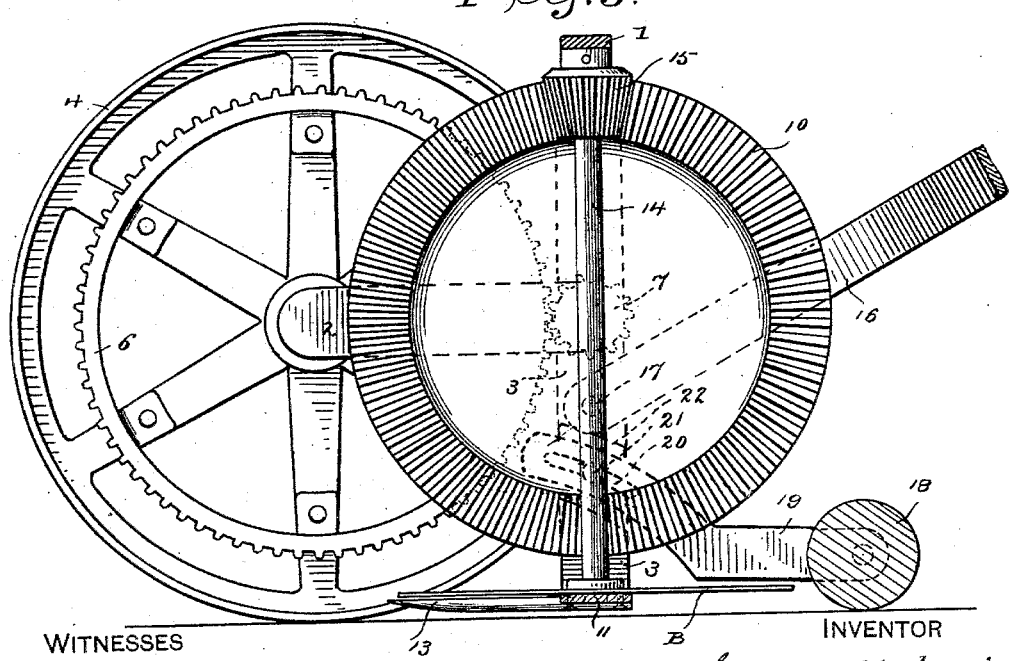

Figure 1 is a plan view of my novel lawn-mower complete; Fig. 2, a front elevation, and Fig. 3 a section on the line X X in Fig. 2.

A denotes the frame of the machine as a whole, which consists, essentially, of an upper cross-bar 1, in the present instance made U-shaped, horizontal arms 2, and depending arms 3.

4 denotes the driving-wheels, which are mounted on spindles 5, which extend outward from the forward ends of the horizontal arms 2. On the inner sides of the driving-wheels are attached driving-gears 6, which mesh with pinions 7 at the outer ends of shafts 8, which are journaled in hubs 9 upon the frame. At the inner ends of shafts 8 are bevel-gears 10.

11 denotes a lower cross-bar, which corresponds with the cutter-bar of an ordinary lawn-mower. This lower cross-bar is rigidly secured to the lower ends of depending arms 3, as at 12.

13 denotes teeth, which are rigidly secured to and extend forward from the lower cross-bar. These teeth correspond substantially with the guard-teeth of an ordinary lawn-mower.

B denotes rotating cutters, which I make star-shaped—that is to say, each cutter consists of a series of radial arms $b$, which may or may not be provided with cutting edges on both sides. I have shown cutters having five arms, but four, six, or seven may be used, if preferred, and the cutting edges may be straight, as in Fig. 1, or curved, if preferred. The cutters are carried by shafts 14, which are journaled in the upper and lower cross-bars, each shaft being provided with a bevel-pinion 15, which meshes with one of the bevel-gears 10, as is clearly shown in Fig. 2.

A handle, pole, or thills may be attached in any ordinary or preferred manner.

I have shown my novel lawn-mower as driven by means of a handle C, provided with spring-arms 16, having holes at their outer ends, said arms being adapted to spring over pins 17, which project inward from depending arms 3, as clearly shown in Fig. 2.

18 denotes a roller which, in connection with the driving-wheels, carries the weight of the machine. This roller is journaled in arms 19, adjustably secured to depending arms 3. The lower cross-bar, and with it the teeth and cutters, may be raised or lowered from the ground, so as to cut more or less closely, by adjusting this roller in the usual or any preferred manner. I have shown the arms as provided with slots 20, through which set-screws 21 pass. The arms slide between lugs 22 on arms 3, which serve as guides and hold the arms in place.

The operation will be readily understood from the drawings. As the machine is pushed along the grass is divided in the usual manner by the teeth and is cut by the rotating cutters which lie close above the teeth, as clearly shown in Figs. 2 and 3. The said cutters rotate in opposite directions, as indicated by the arrows in Fig. 1, owing to the arrangement of gearing described and shown, and the leaving of a narrow line of uncut grass is prevented by the central tooth 13, which is located in front of the slight space between the points of two cutters. This central tooth parts the grass and brings it into position to be cut by one or the other of the cutters, while the opposite direction of rotation of the cutters prevents the grass severed by one cutter from being thrown onto the other cutter.

Having thus described my invention, I claim—

1. The combination with the upper cross-bar 1, horizontal arms 2 and depending arms 3, of a lower cross-bar rigidly secured to the depending arms, driving-wheels journaled at the forward ends of the horizontal arms, teeth carried by the lower cross-bar, a shaft journaled near each end of the upper and lower cross-bars and carrying a cutter lying close above the teeth and connecting mechanism intermediate the driving-wheels and the shafts whereby the latter are rotated, the cutters coöperating with the edges of the teeth in severing the grass.

2. In a lawn-mower, the combination with the frame A comprising the inverted-U-shaped bar 1, horizontal arms 2 and depending arms 3, of the driving and gear wheels 4, 6 mounted on spindles carried by the arms 2, the shafts 8 mounted in hubs 9 at the ends of the bar 1 and having gears 10 and pinions 7 the latter meshing with the gear-wheels 6, the lower cross-bar 11 secured to the lower ends of the arms 3 and carrying the teeth 13, the shafts 14 journaled in the bars 1 and 11 and having the pinions 15 at their upper ends meshing with the gears 10, said shafts 14 having the cutters B secured to their lower ends and adapted to coöperate with the edges of the teeth in severing the grass.

In testimony whereof I affix my signature in presence of two witnesses.

LUMAN H. DAVIS.

Witnesses:
 WILLIS S. GILBERT,
 JOHN F. GILBERT.